(12) United States Patent
Torigoe et al.

(10) Patent No.: US 9,500,689 B2
(45) Date of Patent: Nov. 22, 2016

(54) NOISE EQUIVALENT CIRCUIT

(75) Inventors: Makoto Torigoe, Tokyo (JP); Hiroki Funato, Tokyo (JP); Takashi Suga, Tokyo (JP); Hideki Osaka, Tokyo (JP); Yoshiyuki Tsuchie, Tokyo (JP); Keisuke Fukumasu, Tokyo (JP); Hitoshi Yokota, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 408 days.

(21) Appl. No.: 14/237,098

(22) PCT Filed: Aug. 30, 2012

(86) PCT No.: PCT/JP2012/071953
§ 371 (c)(1),
(2), (4) Date: Jul. 18, 2014

(87) PCT Pub. No.: WO2013/031874
PCT Pub. Date: Mar. 7, 2013

(65) Prior Publication Data
US 2014/0368217 A1    Dec. 18, 2014

(30) Foreign Application Priority Data
Aug. 30, 2011 (JP) .................................. 2011-187345

(51) Int. Cl.
*G01R 29/26* (2006.01)
*G06F 17/50* (2006.01)
(Continued)

(52) U.S. Cl.
CPC ........... *G01R 29/26* (2013.01); *G01R 29/0864* (2013.01); *G01R 31/001* (2013.01);
(Continued)

(58) Field of Classification Search
CPC .......... G01R 29/0835; G01R 29/0864; G01R 29/26; G01R 31/001; G06F 17/5036; G06F 17/5068; G06F 2217/82; H05K 1/0216; H05K 1/0298; H05K 2201/09309; H05K 2201/09618; H05K 3/0005

USPC .......................................... 324/613, 618–620
See application file for complete search history.

(56) References Cited

U.S. PATENT DOCUMENTS

| 5,745,370 A | 4/1998 | Ohtsu et al. |
| 7,643,980 B2 | 1/2010 | Kazama et al. |
| 2009/0102470 A1 | 4/2009 | Kiso |
| 2010/0138800 A1* | 6/2010 | Kobayashi .......... G06F 17/5068 716/115 |

FOREIGN PATENT DOCUMENTS

| JP | 7-302278 A | 11/1995 |
| JP | 2004-362074 A | 12/2004 |

(Continued)

OTHER PUBLICATIONS

International Search Report dated Nov. 27, 2012 with English translation (four (4) pages).

*Primary Examiner* — Vincent Q Nguyen
(74) *Attorney, Agent, or Firm* — Crowell & Moring LLP

(57) ABSTRACT

Provided is a noise equivalent circuit for completing an EMC analysis in a practical time and through a low-cost calculation process at an upstream stage of system design. The noise equivalent circuit includes one or more energy sources; a propagation path for propagation of energy from the energy source including a conductive path such as a cable and an electromagnetic field coupling path due to the coupling of an electric field and a magnetic field with another electronic device or cable; and a GND port connected to a system, and each port is represented by the noise voltage source or the noise current source and the internal impedance. This noise equivalent circuit can determine an external impedance that is varied depending on a load connected externally or the distance from an external device or a cable, whereby the noise of the system as a whole can be analyzed.

7 Claims, 6 Drawing Sheets

A

Example of actual system

B

Example of noise equalizing circuit

(51) Int. Cl.
*G01R 29/08* (2006.01)
*G01R 31/00* (2006.01)
*H02M 1/44* (2007.01)

(52) U.S. Cl.
CPC ....... *G06F17/5036* (2013.01); *G01R 29/0835* (2013.01); *G06F 2217/82* (2013.01); *H02M 1/44* (2013.01); *Y02T 10/82* (2013.01)

(56) References Cited

FOREIGN PATENT DOCUMENTS

| | | |
|---|---|---|
| JP | 2005-165871 A | 6/2005 |
| JP | 2006-209590 A | 8/2006 |
| JP | 2009-98891 A | 5/2009 |

* cited by examiner

A

Example of actual system

B

Example of noise equalizing circuit

NOISE EQUIVALENT CIRCUIT

TECHNICAL FIELD

The present invention relates to a noise equivalent circuit and a technology for noise analysis (evaluation) in noise analysis design technology for electric devices, for example.

BACKGROUND ART

Generally, when voltage or current is switched at high speed in an electronic device, unwanted electromagnetic wave is generated, sometimes causing radio or wireless communications interference. Thus, electromagnetic compatibility (EMC) standards have been established by institutions, such as the FCC in the U.S. and the VCCI in Japan, so as to regulate the intensity of an electromagnetic field emitted from electronic devices.

For electronic components mounted on automobiles and trains, independent regulations have been specified by automobile manufacturers and railroad operators. Thus, electronic component manufacturers need to develop and supply electronic components that conform to the regulations.

While various companies' EMC standards for onboard electronic components have provisions regarding EMC testing methodology assuming specific states of implementation, the testing methodology as it stands now does not completely reproduce the actual state of mounting on a vehicle. This is due to the fact that, while the amount of electromagnetic noise radiating from a system varies depending on the implementation conditions of a component or the load, it is difficult to perform the EMC test on an electronic component in every condition in which the component may actually be used.

In this respect, as examples of the noise analysis design technology for electric devices, Patent Documents 1 and 2 may be cited.

Patent Document 1 describes a technology such that, in an electromagnetic field analysis device for significantly decreasing the amount of memory used by a computer and the simulation calculation time, an error between the result of electromagnetic field calculation by simulation and the result of actual electromagnetic field calculation can be minimized.

Patent Document 2 describes a design technique such that, in designing a printed wiring board, an accurate electromagnetic radiation simulation is performed by electromagnetic field analysis.

PRIOR ART DOCUMENTS

Patent Documents

Patent Document 1: JP Patent Publication (Kokai) No. 2006-209590 A

Patent Document 2: JP Patent Publication (Kokai) No. 2004-362074 A

SUMMARY OF THE INVENTION

Problem to be Solved by the Invention

Regarding the noise analysis design technology for electric devices, an analysis conducted by the present inventors has revealed the following. In Patent Document 1, the model simplification considers only the return current through the vias (holes connecting layers of the multilayered substrate for providing continuity). The document does not discuss substrate-to-substrate or substrate-to-cable issues, and no extraction of portions with high degrees of contribution (main routes) is performed. Patent Document 2 is concerned with electromagnetic field analysis of a substrate and does not discuss a technique for analyzing an electromagnetic field radiated from a system as a whole.

Further, according to the noise analysis design technologies for electric devices described in Patent Documents 1 and 2, when an EMC design for an automobile inverter is to be calculated by electromagnetic field analysis, if the allowable leakage power is to be limited to a small value of 1 nW in a 100 kW-class inverter design, for example, the ratio of output power to the allowable leakage power needs to be limited to be not more than $10^{-14}$. For this purpose, a very highly accurate analysis is required; however, as thing stand now, the calculations cannot be completed within a practical time even at the expense of an increase in computer costs.

The present invention was made in view of the above, and provides an EMC analysis simulation technology that can determine whether an EMC standard is satisfied within a practical time and through a low-cost calculation process in an upstream stage of design (initial stage of design) during system construction.

Means for Solving the Problems

In order to solve the above problem, the present invention provides a noise equivalent circuit for evaluating noise of an electric device or an electronic device so as to support EMC analysis simulation. A representative example is a noise equivalent circuit for an electric device such as an automotive inverter. The noise equivalent circuit representing a system including the electric device includes one or more energy sources; a propagation path for propagation of energy from the energy source including a conductive path such as a cable and an electromagnetic field coupling path due to the coupling of an electric field and a magnetic field with another electronic device or cable; and a GND port connected to the system. Each port is represented by a noise voltage source or a noise current source and an internal impedance. This noise equivalent circuit can be used to determine an external impedance that is varied depending on a load connected externally or the distance from the external device or a cable, whereby the noise of the system as a whole can be analyzed.

Effects of the Invention

According to the present invention, the behavior of noise can be simulated in a practical time and through a low-cost calculation process in an upstream stage of system construction design (initial stage of design).

Other problems, configurations, and effects of the invention will become apparent from the following description of the mode for carrying out the present invention and the attached drawings.

MODE FOR CARRYING OUT THE INVENTION

Figure 1:
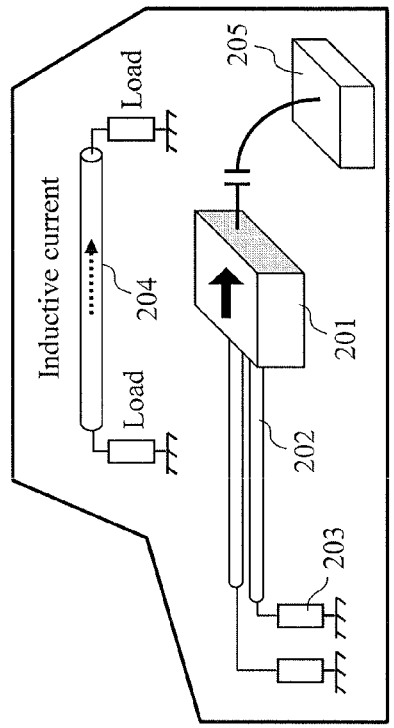
FIG. 1 illustrates a configuration example of a noise equivalent circuit according to a first embodiment of the present invention.
Figure 1:
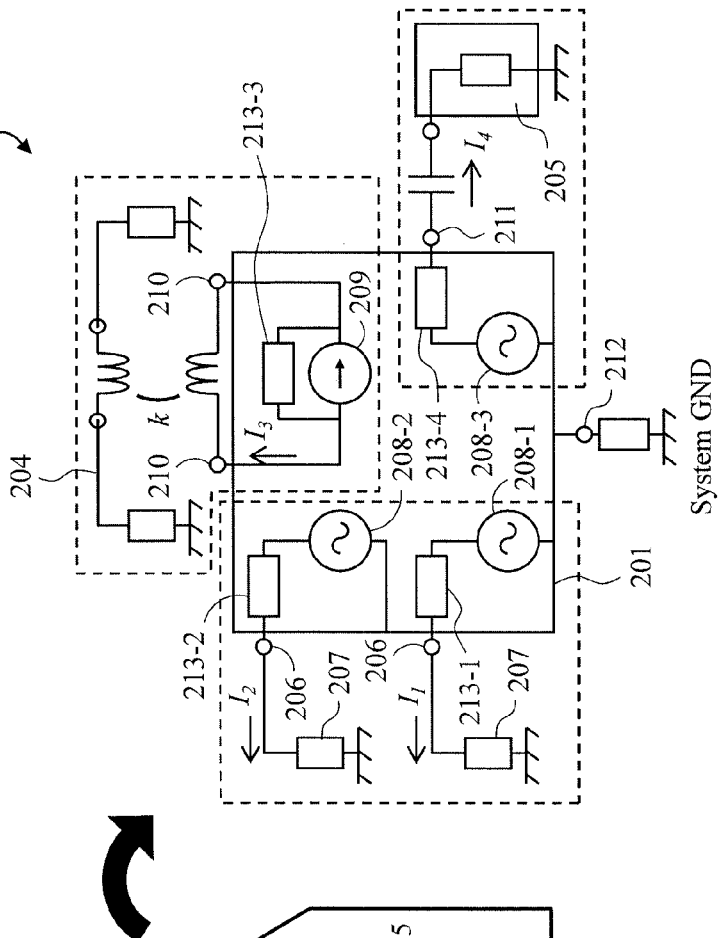

If noise is measured after a system has actually been manufactured and then a countermeasure is sought because an EMC standard is exceeded, the system that has actually been produced becomes a waste, and the result is an increase in cost. If the rough extent of noise can be estimated at design stage, the need for constructing the system again can be eliminated, and the manufacturing cost can be reduced.

The present invention provides a component noise equivalent circuit that can analyze the behavior of noise produced in a system at high speed.

In the following, the outline of the noise analysis design technology for electric devices according to an embodiment of the present invention will be described with reference to the attached drawings. According to the present embodiment, circuit analysis is used for realizing a fast EMC analysis technology. The EMC, which is inherently a problem of electromagnetic phenomenon, is ordinarily handled by solving an electromagnetic field analysis. According to the present embodiment, the analysis speed is increased through an EMC analysis using an electric circuit in a change of perspective. However, it should be noted that the present embodiment is merely an example of implementing the present invention and does not limit the technical scope of the present invention. Throughout the several views of the drawings, common configurations are designated by similar reference numerals.

(1) First Embodiment

Configuration Example of Noise Equivalent Circuit

FIG. 1 shows diagrams for describing a configuration example of a noise equivalent circuit according to a first embodiment of the present invention. FIG. 1A illustrates an example of an actual system (such as a hybrid vehicle or an electric automobile). FIG. 1B illustrates a circuit example in which the system of FIG. 1A is represented by a noise equivalent circuit.

The actual system, as shown in FIG. 1A, includes an object device 201, such as an inverter, loads 203, cables 202 connecting the object device 201 and the loads 203, another cable configuring another circuit (another wiring; such as an electric cable for controlling the engine on a hybrid vehicle when the load is an ECU) 204, loads (electric devices such as an ECU, a navigation system, or a radio), and another device 205.

A representation of the actual system of FIG. 1A as a noise equivalent circuit is shown in FIG. 1B. The noise equivalent circuit 1 includes a circuit representing the object device 201, load models 207, a circuit representing the other cable 204 and loads, and a circuit representing the other device 205. The circuit representing the object device includes at least one internal impedance 213, at least one noise voltage source 208, and at least one noise current source 209. The noise equivalent circuit 1 includes, as propagation paths of noise from the object device 201, conductive ports 206, inductive coupling ports 210, a capacitive coupling port 211, and a GND port 212. Each of the ports is represented by any of noise voltage sources 208-1 to 208-3, a noise current source 209, or any of internal impedances 213-1 to 213-4. It should be noted that in the actual system, the internal impedance or the number of noise voltage sources or current sources configured in the noise equivalent circuit 1 may vary depending on the presence or absence or the number of other devices or adjacent cables connected to the object device 201.

The conductive ports 206 are ports representing noise currents ($I_1$ and $I_2$) leaking outside the device via the cables. The amount of leakage of the noise currents is determined by the external load model 207. The inductive coupling port 210 is a port representing an inductive current ($I_3$) induced in a metal component such as the external cable 204 by a noise current produced in the device. The inductive current is determined by the load model connected to the cable 204. The capacitive coupling port 211 is a port representing a noise voltage (current value is $I_4$) produced in the other device 205 by the noise voltage 208-3 produced in the object device 201. The noise voltage produced by the capacitive coupling 211 is determined by the noise model of the other device 205.

The value of capacitance set in the capacitive coupling port 211 may vary depending on the distance between the object device 201 and the other device 205 and their overlapping area. Namely, the capacitance value is described as a function of the distance between the devices and the overlapping area.

The inductance of the inductive coupling port 210 and its coupling coefficient k vary depending on the distance between the object device 201 and the other cables 204 and the cable length. Namely, the inductance value and the coupling coefficient k are represented as a function of the distance between the device and the cables or between the cables, and the cable length. The noise N to be evaluated is expressed by the inner product of the coupling coefficient ($k_1, \ldots, k_n$) in each cable or device and the current that flows through each cable or the inductive current produced ($I_1, \ldots, I_n$). Namely, $N = k_1 \cdot I_1 + K_2 \cdot I_2 + \ldots K_n \cdot I_n$. A noise analysis is performed by evaluating the noise assumed by comparing the N with an EMC standard.

<Method of Determining Capacitive Coupling Port Value>

Figure 2:
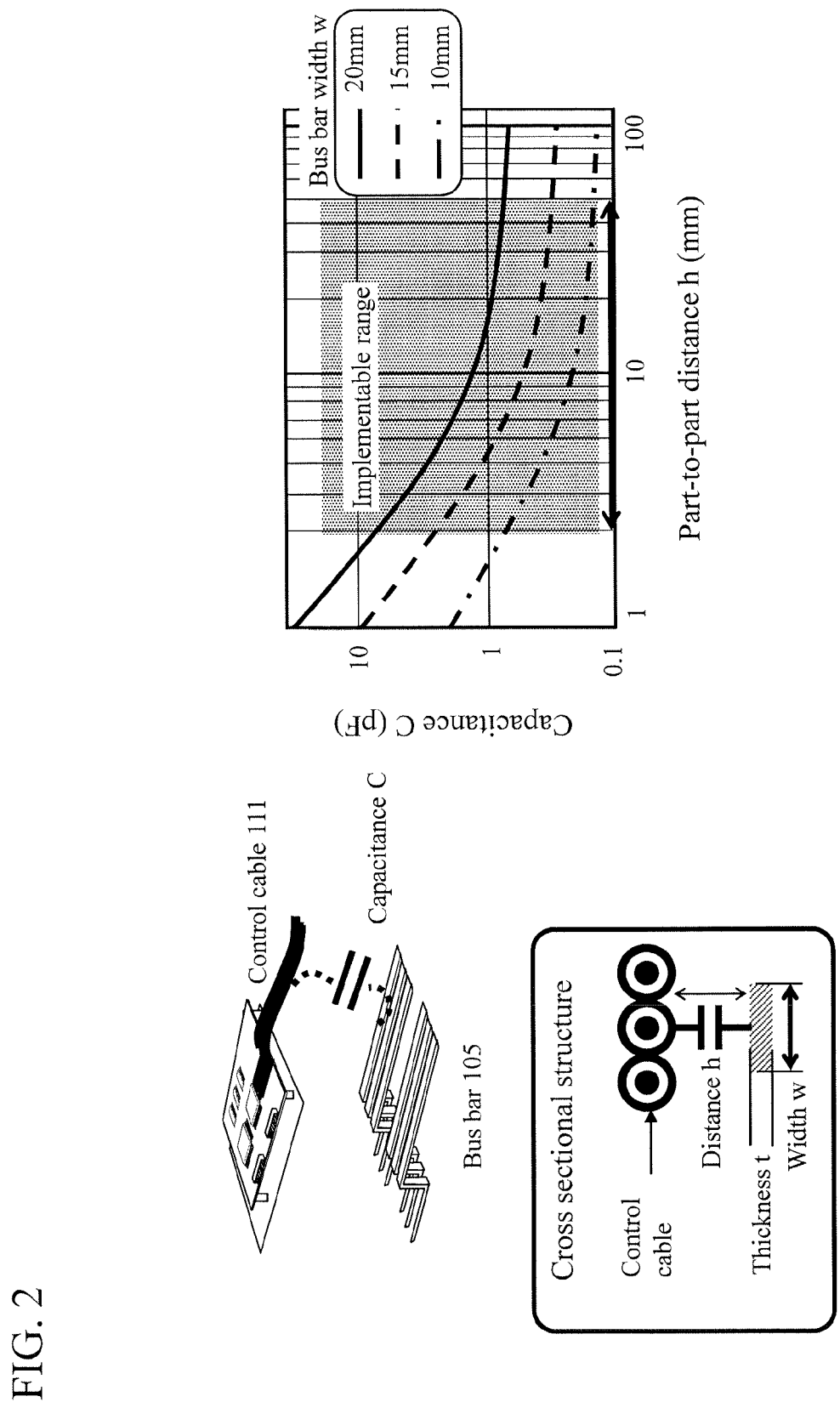
FIG. 2 illustrates a method for determining a capacitive coupling port value in the first embodiment of the present invention.

FIG. 2 illustrates an example of the method of determining the capacitive coupling port 211 of the noise equivalent circuit shown in FIG. 1. With reference to FIG. 2, the method of determining the capacitive coupling port value between a bus bar 105 and a control cable 111, for example, will be described.

The capacitance value of the capacitive coupling port 211 varies depending on the position of a component or dimensions between components. Thus, when a parasitic capacitance C between the control cable 111 and the bus bar 105 shown in FIG. 2 is calculated, for example, first, an implementable range, such as a distance h between the range control cable 111 and the bus bar 105, or a width w of the bus bar 105, is determined in a cross section structure. Within the implementable range, a constant is calculated by using a coupling capacitance analysis formula or two-dimensional electromagnetic field analysis. The value of the constant is a function with respect to the positions of the control cable 111 and the bus bar 105, and can determine the capacitance value when the structure such as distance or width is changed.

(2) Second Embodiment

Figure 3:
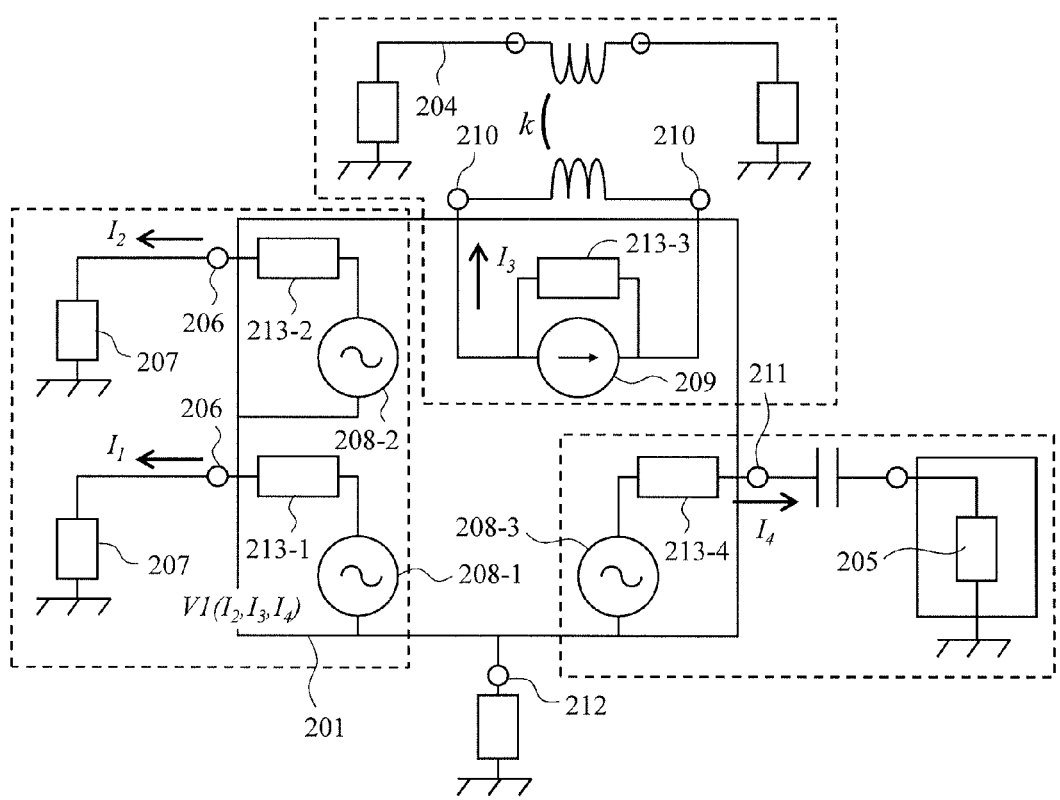
FIG. 3 illustrates a configuration example of the noise equivalent circuit according to a second embodiment of the present invention.

FIG. 3 is a diagram for describing a configuration example of the noise equivalent circuit according to the second embodiment of the present invention.

While, in the first embodiment (see FIG. 1), the noise voltage sources 208-1 to 208-3 and the noise current source 209 are independent from each other, the same noise sources may be driven at each port, or the noise source may be varied by the current that flows through each port. In such case, each of the noise voltage sources and noise current source can be represented by a function of a current that flows through another port, or a voltage of another port. Namely, $V_1$ in FIG. 2, for example, is not determined solely by $I_1$, but is varied by the value of current flowing through other ports. Thus, $V_1$ is represented by a function of $I_2$ to $I_4$.

Figure 4:
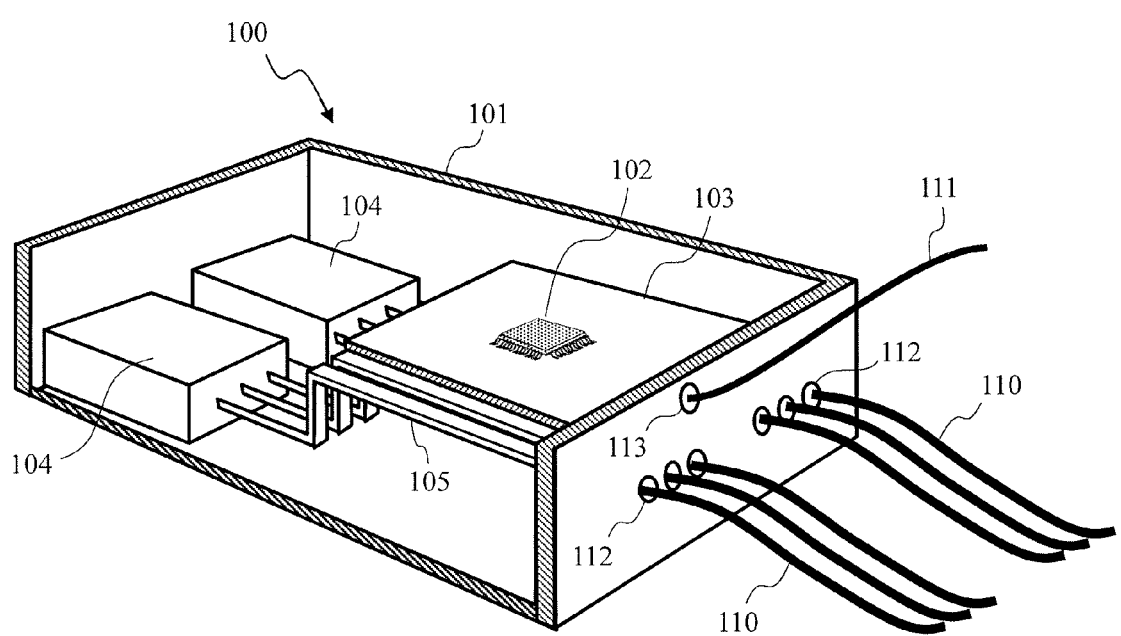
FIG. 4 illustrates a structure example of an inverter as the object for noise analysis (evaluation).
Figure 5:
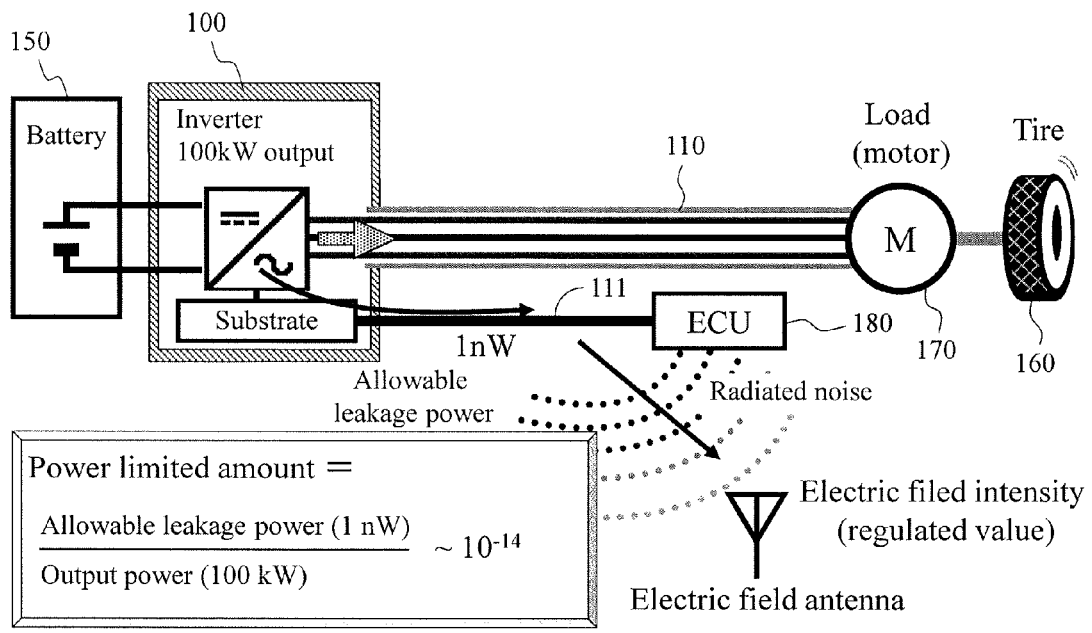
FIG. 5 is a diagram for explaining an EMC design of an automotive inverter as the object for noise analysis according to an embodiment of the present invention.
Figure 6:
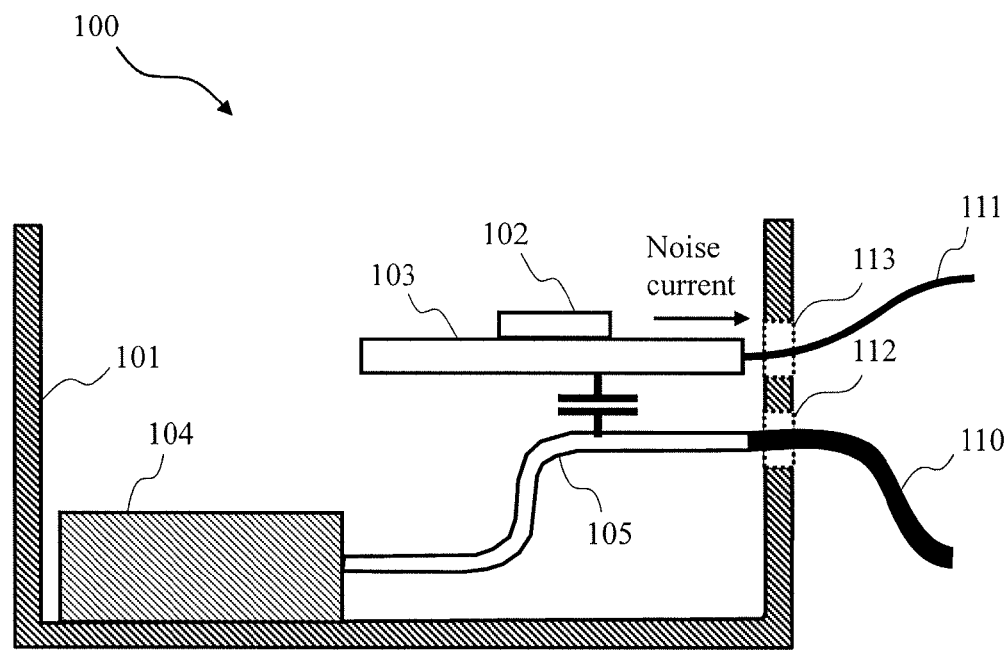
FIG. 6 is a cross sectional view of the inverter of FIG. 4.

(3) Specific Example of Noise Equivalent Circuit: Noise Equivalent Circuit for Automotive Inverter FIGS. 4 to 6 are diagrams for describing the EMC design of an automotive inverter to which the present invention is applied. FIG. 4 illustrates a structure example of the automotive inverter. FIG. 5 illustrates the relationship between the automotive inverter 100 of FIG. 3 and the other device and cables. FIG. 6 is a cross sectional view of the automotive inverter 100.

The automotive inverter 100, which is a device corresponding to the object device 201 of FIGS. 1 and 3, includes an LSI 102 disposed on a substrate 103, a power module (IGBT) 104, and a bus bar 105 connected to the power module 104, which are housed in a housing 101, as shown in FIG. 4. The substrate 103 is connected with the control cable 111 through a via 113 of the housing 101. The bus bar 105 is connected to a motor cable 110 through a via 112 of the housing 101.

As shown in FIG. 5, a battery 150 is connected to the inverter 100. The motor cable 110 is drawn out of the inverter 100 and connected to a motor 170 for driving a tire 160. The control cable 111 is connected to an engine control unit (ECU) 180.

FIG. 6 shows a cross section of the inverter 100 shown in FIG. 5. As shown in FIG. 6, capacitive coupling is produced between the substrate 103 with the LSI 102 mounted thereon and the bus bar 105 connected to the power module 104. Between the substrate 103 and a ground plate, inductive coupling is produced. Between the substrate 103 and the housing 101, conductive coupling is produced.

In the case of an automobile, in order to drive the tire 160 with the motor 170, the inverter 100 is used for converting a direct current from the battery 150 to an alternating current. A control signal for accelerating or decelerating the automobile is transmitted from the ECU 180 via the control cable 111 to the inverter 100. The inverter 100 performs torque control by pulse modulation in accordance with the control signal.

During pulse modulation of the inverter 100, noise is produced and partly leaked outside, creating noise radiation. In order to prevent the electric field intensity at an electric field antenna from exceeding a regulation value, the allowable leakage power is equivalent to 1 nW. Meanwhile, the maximum output of the inverter 100 is of a 100 kW class, and, in order to limit the output voltage to not more than the allowable leakage power, the ratio of the two needs to be limited to be not more than $10^{-14}$. Namely, in the EMC design for reducing the radiation noise to be not more than the regulation value by suppressing the leakage to the outside of the device of the inverter 100, the leakage power needs to be reduced by a factor of 14 with respect to the output, which is difficult.

Thus, according to the conventional technology described above, calculations for the EMC design could not be completed within a practical time even at the expense of computing cost. However, by applying the noise equivalent circuit according to the present invention (see FIGS. 1 and 2, for example), the calculation process can be completed within a practical time and at low cost.

(4) Conclusion

The present invention relates to a noise analysis design technology for electric devices, which may be utilized in an EMC noise analysis design method for an automotive inverter in particular.

While the invention made by the present inventors has been described with reference to embodiments, it goes without saying that the present invention is not limited to the embodiments and that various modifications can be made without departing from the gist of the invention.

An actual system to be represented by the noise equivalent circuit according to the present invention includes, for example, a first electronic device (device including an inverter); a second electronic device (EMC); a load (motor) connected to the first electronic device; and an external metal component (external cable) disposed externally with respect to the first electronic device. The noise equivalent circuit according to the present invention is a circuit for evaluating noise propagating from the first electronic device in the system. The noise equivalent circuit according to the present invention includes another device circuit representing the second electronic device; an evaluation object device circuit including one or more energy sources (representing an inverter, an LSI on a substrate, a switching power supply, or the like) and representing the first electronic device; a load model (LRC) representing the load (motor); a conductive path for conducting energy from the energy source to the load model via a conductive port; a propagation path representing an influence from the external metal component (external cable); an electromagnetic field coupling path by a coupling of an electric field and a magnetic field between the propagation path and the second electronic device; and a ground port connecting ground and the evaluation object device circuit. The evaluation object device circuit and the other device circuit are connected via a capacitive coupling port. The evaluation object device circuit and the propagation path are connected via an inductive port. By representing the system by such an equivalent circuit, accurate noise analysis simulation can be implemented without actually assembling the system.

More specifically, the evaluation object device circuit further includes, in addition to the energy source, the ground port, the conductive port, the capacitive coupling port, and the inductive coupling port, a noise voltage source, a noise current source, and an internal impedance. Each of the conductive port, the capacitive coupling port, and the inductive coupling port is represented by the noise voltage source or the noise current source and the internal impedance. By thus representing the evaluation object device by a noise equivalent circuit, the generated noise can be more accurately evaluated.

The noise voltage source and the noise current source may be operated independently from each other, or the noise voltage source and the noise current source may be represented by a function of current or voltage at a port other than the ports to which the sources are connected (so that there is a dependency relationship). In this way, the noise equivalent circuit can be configured to be better matched with the system configuration, whereby more accurate noise analysis can be implemented.

REFERENCE SIGNS LIST

100 Inverter
101 Housing
102 LSI
103 Substrate
104 Power module
105 Bus bar
110 Motor cable
111 Control cable
112 Opening portion
150 Battery
160 Tire
170 Motor
180 ECU
201 Object device
202 Cable
203 Load
204 Another cable (external cable)
205 Another device
206 Conductive port
207 Load model
208 Noise voltage source
209 Noise current source
210 Inductive coupling port
211 Capacitive coupling port
212 GND (ground) port
213 Internal impedance

The invention claimed is:

1. A noise equivalent circuit for evaluating noise propagating from a first electronic device in an actual system and for recording that noise evaluation in a data storage device, each component of the noise equivalent circuit simulating a corresponding component of the actual system,
the noise equivalent circuit comprising:
   a device circuit representing a second electronic device in the actual system;
   an evaluation object device circuit including one or more energy sources and representing the first electronic device;
   a load model representing a load connected to the first electronic device;
   a conductive path for conducting energy from the one or more energy sources of the evaluation object device circuit via a conductive port to the load model;
   a propagation path representing an influence from an external metal component disposed externally with regard to the first electronic device in the actual system;
   an electromagnetic field coupling path representing coupling of an electric field and a magnetic field between the external metal component and the second electronic device; and
   a ground port connecting ground and the evaluation object device circuit.

2. The noise equivalent circuit according to 1, wherein the evaluation object device circuit and the device circuit are connected via a capacitive coupling port.

3. The noise equivalent circuit according to 1, wherein the evaluation object device circuit and the propagation path are connected via an inductive port.

4. The noise equivalent circuit according to 3, wherein:
   the evaluation object device circuit further includes, in addition to the energy source, the ground port, the conductive port, the capacitive coupling port, and the inductive coupling port, a noise voltage source, a noise current source, and an internal impedance; and
   each of the conductive port, the capacitive coupling port, and the inductive coupling port is represented by the noise voltage source or the noise current source and the internal impedance.

5. The noise equivalent circuit according to 4, wherein the noise of the first electronic device to be evaluated is represented by the inner product of a current $I_n$ and a coupling coefficient $k_n$, where $I_n$ is the current produced at the conductive port, the capacitive coupling port, and the inductive coupling port, $k_n$ is the coupling coefficient at each port, and n is a positive integer expressing the number of ports.

6. The noise equivalent circuit according to 5, wherein the noise voltage source and the noise current source are operated independently from each other.

7. The noise equivalent circuit according to 5, wherein:
   the noise voltage source and the noise current source are each connected to the conductive port, the inductive coupling port, or the capacitive coupling port; and
   the noise voltage source and the noise current source are represented by a function of current or voltage at a port other than the ports to which the noise voltage source and the noise current source are connected.

* * * * *